United States Patent
Picht et al.

(10) Patent No.: US 6,417,611 B1
(45) Date of Patent: Jul. 9, 2002

(54) PHOSPHOR COMPOSITION COMPRISING AN AMIDE GROUP-CONTAINING OR URETHANE GROUP-CONTAINING ORGANIC BINDER

(75) Inventors: Friederike Picht, Düren; Wolfram Czarnojan, Aachen; Claus Feldmann, Aachen; Hans-Otto Jungk, Aachen; Jacqueline Merikhi, Aachen, all of (DE); Roel Van De Belt, Eindhoven (NL); Anne M. A. Van Dongen, Eindhoven (NL); Alexandra J. Heijden, Eindhoven (NL)

(73) Assignee: Koninlijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/363,347

(22) Filed: Jul. 29, 1999

(30) Foreign Application Priority Data

Jul. 30, 1998 (DE) .......................... 198 34 377

(51) Int. Cl.$^7$ .............................. H01J 29/10
(52) U.S. Cl. ............... 313/467; 313/479; 313/469; 313/480; 252/301.4 R; 252/301.6 R; 428/407; 428/403
(58) Field of Search ............... 313/467, 469, 313/477 R, 479, 480, 635, 484, 486, 489; 428/407, 403, 323; 252/301.4 R, 301.6 R

(56) References Cited

U.S. PATENT DOCUMENTS

| | | | | |
|---|---|---|---|---|
| 4,297,681 A | * | 10/1981 | Dircksen | 340/366 F |
| 5,041,334 A | * | 8/1991 | Nakajima et al. | 428/407 |
| 5,246,781 A | * | 9/1993 | Jeong | 428/407 |
| 5,336,080 A | * | 8/1994 | Sumitomo et al. | 428/407 |
| 5,366,834 A | * | 11/1994 | Yomeda et al. | 430/23 |
| 6,013,979 A | * | 1/2000 | Pitch et al. | 313/467 |
| 6,290,874 B1 | * | 9/2001 | Picht et al. | 252/301.4 R |

FOREIGN PATENT DOCUMENTS

| | | | | |
|---|---|---|---|---|
| EP | 0549327 A2 | | 6/1993 | C09K/11/02 |
| JP | 10140147 A | * | 5/1998 | C09K/11/08 |

* cited by examiner

*Primary Examiner*—Nimeshkumar D. Patel
*Assistant Examiner*—Mariceli Santiago
(74) *Attorney, Agent, or Firm*—Ernestine C. Bartlett

(57) ABSTRACT

A display screen, in particular a color display screen for a cathode ray tube, comprises a phosphor layer which includes a phosphor composition of a phosphor with a coating comprising a water-soluble organic binder, which is selected from the group formed by the polyurethanes, polyacrylamides, polyamide resins, etherified melamine compounds and melamine-formaldehyde compounds, and etherified urea-formaldehyde resins, and comprising oxygen compounds of one or more elements selected from the group formed by the alkaline earth elements and zinc. Important advantages obtained are a substantially improved sieving behavior of the phosphor powder, an increased adhesion of pigment particles to the phosphor grains, an improved suspension stability as well as an improved adhesion of the phosphor to the display screen glass.

12 Claims, 1 Drawing Sheet

PHOSPHOR COMPOSITION COMPRISING AN AMIDE GROUP-CONTAINING OR URETHANE GROUP-CONTAINING ORGANIC BINDER

BACKGROUND OF THE INVENTION

The invention relates to a display screen, in particular a color display screen for a cathode ray tube, comprising a phosphor layer which includes a phosphor composition of a phosphor with a coating comprising a water-soluble organic binder. The invention also relates to a phosphor composition of a phosphor with a coating comprising a water-soluble organic binder.

Display screens of cathode ray tubes are provided on the inner surface with structured phosphor layers exhibiting dot-shaped or stripe-shaped patterns. In the case of color display screens, each phosphor element of the phosphor layer is composed of a triad of phosphor elements, each phosphor element emitting one of the three primary colors red, blue and green. This structured phosphor layer is customarily applied to the screen glass by means of a photochemical process in which phosphor suspensions are used in the wet-chemical variant, and phosphor lacquers are used in the dry variant. In the wet-chemical process for coating screen glass with phosphors, aqueous phosphor suspensions are used which include, for example, polyvinyl alcohol (PVA) as the binder and ammonium dichromate (ADC) as the light-sensitive component.

In the wet-chemical display screen process, the properties of the phosphor particles are substantially influenced by the surface properties of the phosphor powders from which the phosphor suspensions are prepared, irrespective of whether the phosphor particles are processed in suspension or the phosphor layer is formed on the display screen glass. To control the surface properties of the phosphor powders, a method which yields satisfactory results, in view of the display screen process, includes providing the inorganic phosphor powders, after their manufacture, with chemically different coatings. Besides, pigmentation of phosphors for improving the contrast in the display screen generally requires the use of an additional binding agent which ensures that the adhesion of the pigment on the phosphor material is satisfactory.

EP 0 549 327 discloses a phosphor for a cathode ray tube, which phosphor comprises phosphor particles and a surface-treating substance which is provided on the phosphor particles, which substance is composed of a mixture including a metal alginate, which contains at least a type of a metal selected from the group formed by zinc, aluminum and an alkaline earth metal, and at least a type of a water-soluble binder selected from the group formed by Arabic gum, gelatin, polymethacrylamide and polyvinyl alcohol.

This phosphor has the drawback that the sieving properties, the adhesion of the pigment to the phosphor as well as the adhesion of the structured phosphor layer to the screen glass are sub-optimal.

SUMMARY OF THE INVENTION

At present, however, ever higher requirements are imposed on the processability of phosphor powders in suspension as well as on the quality of display screens regarding brightness, color purity, absence of fog, definition and adhesion of the structured phosphor coating.

Therefore, it is an object of the invention to provide a display screen comprising a phosphor layer, which display screen exhibits optimum values as regards brightness, color purity, absence of fog, definition and adhesion of the phosphor material to the screen glass.

In accordance with the invention, this object is achieved by a display screen comprising a phosphor layer including a phosphor composition of a phosphor with a coating comprising a water-soluble organic binder, which is selected from the group formed by the polyurethanes, polyacrylamides, polyamide resins, etherified melamine compounds and melamine-formaldehyde compounds and etherified urea-formaldehyde resins, and comprising oxygen compounds of one or more elements selected from the group formed by the alkaline earth elements and zinc.

A display screen in accordance with the invention is characterized by a surprising improvement in display-screen brightness, color purity and adhesion of the phosphor to the screen glass. The phosphor layer further exhibits a high packing density of the phosphor material in the phosphor layer and hence optimum brightness of the screen. The phosphor layer further exhibits a good homogeneity, i.e. prevention of structures owing to the flow properties of the suspension, and is free of "pinholes". In addition, the phosphor layer is sharply defined and the thickness of the phosphor layer is homogeneous. The shadow mask structure is imaged with high precision onto the structured phosphor layer. The individual phosphor elements are sharply defined and adhere well to the screen glass. Fog formation in the non-exposed screen area of the phosphor layer is low.

Within the scope of the invention it is preferred that the phosphor composition includes polycarboxylates, gelatin or silicon dioxide.

It is also preferred that the solids content of the water-soluble organic binder in the phosphor layer ranges from 0.01% by weight to 1.0% by weight with respect to the phosphor, that the content of the oxygen compounds of the alkaline earth elements and zinc in the phosphor layer ranges from 0.01% by weight to 0.80% by weight with respect to the phosphor, and that the silicon dioxide content, calculated as $SiO_2$, in the phosphor layer ranges from 0.01% by weight to 1.0% by weight with respect to the phosphor.

Within the scope of the invention it is particularly preferred that the water-soluble organic binder has a molecular mass below 300,000, particularly below 100,000.

Within the scope of the invention it is particularly preferred that the organic binder is a polyurethane having a molecular mass below 20,000. Such a phosphor composition is characterized by a very good sieving behavior.

It may furthermore be preferred that the oxygen compound is a zinc-oxygen compound.

Within the scope of the invention it may be preferred that the silicon dioxide is composed of silicates or of colloidal $SiO_2$ particles having an average particle size of 4 nm<d<150 nm in accordance with a specific surface area of 25 $m^2/g < A_s < 550$ $m^2/g$.

It may also be preferred that the weight ratio of the $SiO_2$ particles (calculated as $SiO_2$) relative to the overall quantity of the metal-oxygen compounds of the alkaline earth elements and zinc lies in the range from 1:10 to 30:1, and the weight ratio of the $SiO_2$ particles relative to the overall quantity of the organic binder lies in the range from 1:30 to 30:1.

It may also be preferred that the coating includes 0.01% by weight to 15% by weight of a color filter pigment.

Within the scope of the invention it is further particularly preferred that the water-soluble organic binder comprises at least a compound selected from the group formed by the polyacrylamides and gelatins, and at least a compound selected from the group formed by the etherified melamine compounds and melamine-formaldehyde compounds and the etherified urea-formaldehyde resins, the weight ratio of the compounds selected from the group formed by the polyacrylamides and gelatins relative to the overall quantity of the compounds selected from the group formed by the etherified melamine compounds and melamine-formaldehyde compounds and the etherified urea-formaldehyde resins ranging from 1:5 to 20:1.

Such a phosphor layer is characterized by a sharp definition of the structured phosphor layer and a very good adhesion. In addition, pigment particles bonded to the phosphor grains in the manner described hereinabove exhibit a very good adhesion to the phosphor.

The invention also relates to a phosphor composition of a phosphor with a coating comprising a water-soluble organic binder, which is selected from the group formed by the polyurethanes, polyacrylamides, polyamide resins, etherified melamine compounds and melamine-formaldehyde compounds, etherified urea-formaldehyde resins, and comprising oxygen compounds of one or more elements selected from the group formed by the alkaline earth elements and zinc. Such a phosphor composition can be readily processed as it exhibits a very good sieving behavior of the powder and a high filterability of the suspension also after a prolonged period of time and at lower pH-values. The extremely good dimensional stability of the suspension of phosphors coated in accordance with the invention is demonstrated by the good stability of the particle-size distribution upon adding electrolyte solution and treating with ultrasound. Further advantages reside in the improved adhesion of the phosphor to the display screen glass, the very small degree of fog-formation, the high color purity as a result of the excellent adhesion of the pigment to the phosphor grains, as well as the high packing density and very good homogeneity of the relevant phosphor layers.

In the suspension, the phosphor composition exhibits a high stability, which manifests itself as a high filterability, a negligibly small quantity of loose pigment material as well as insensitivity of the particle-size distribution to the addition of electrolyte solution and to an ultrasound treatment for a prolonged period of time at critical pH-values. Said phosphor composition is also characterized by a very good sieving behavior.

DETAILED DESCRIPTION OF THE INVENTION

Figure 1:
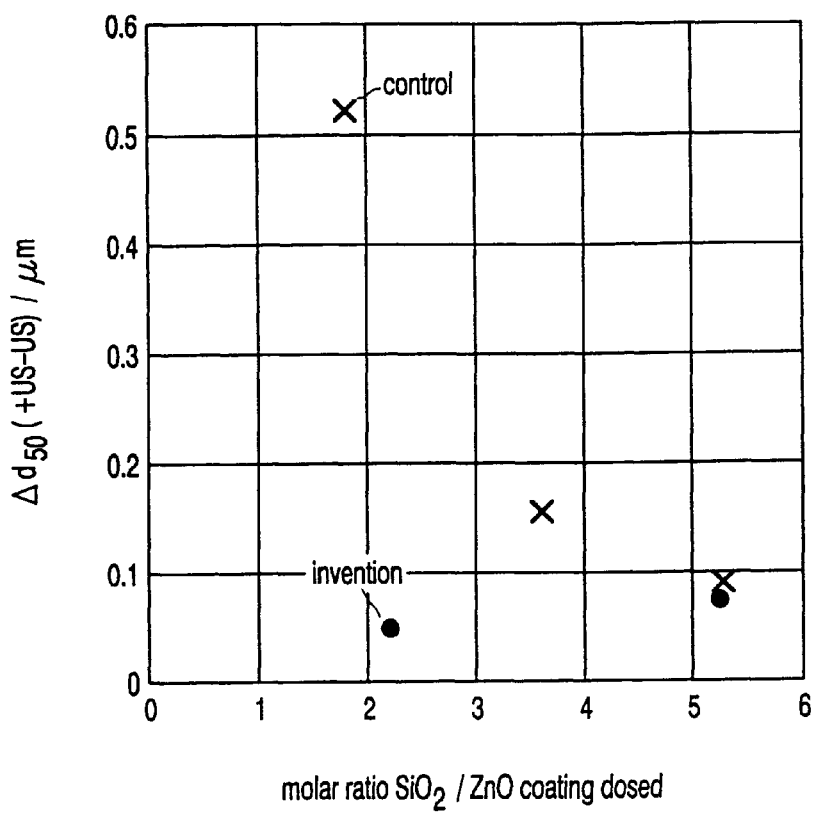
FIG. 1 shows the dimensional stability of phosphor compositions in accordance with the invention in relation to the dimensional stability of reference phosphor compositions.

These and other aspects of the invention will be apparent from and elucidated with reference to the figures of the drawing and the embodiments described hereinafter.

For the phosphor composition in accordance with the invention, all the customary phosphors can be used as starting materials, such as blue ZnS:Ag, green ZnS:Cu,Au, green ZnS:Cu or red $Y_2O_2S$:Eu. It may alternatively be preferred to use an already pigmented phosphor for the starting material, which phosphor is coated with color filter pigments, for example $CoAl_2O_4$-pigmented ZnS:Ag or $Fe_2O_3$-pigmented $Y_2O_2S$:Eu, to improve the picture contrast. The color pigment may be deposited in a coating process together with the coating constituents in accordance with the invention, that is oxygen compounds of one or more elements selected from the group formed by the alkaline earth elements and zinc, and with one or more components of a water-soluble organic binder including amide groups or urethane groups selected from the group formed by the polyurethanes, polyacrylamides, polyamide resins, etherified melamine compounds and melamine-formaldehyde compounds, etherified urea-formaldehyde resins as well as gelatin and, optionally, silicon dioxide, or a separate coating process may be used to apply the color pigment to the phosphor particles so as to form a separate coating.

The phosphor coating further includes one or more water-soluble organic binders with amide or urethane groups selected from the group formed by the polyurethanes, polyacrylamides, polyamide resins, etherified melamine and melamine-formaldehyde compounds, etherified urea-formaldehyde resins as well as, optionally, polycarboxylates and gelatins. Apart from sodium alginate and gelatin, all of the above-mentioned organic binders are available either as a liquid resin or as an aqueous solution and can be randomly diluted with water. Just like sodium alginate, gelatin is a solid substance, for example a powder which can be dissolved by heating in water.

The phosphor coating also includes oxygen compounds of one or more elements selected from the group formed by the alkaline earth elements and zinc. Within the scope of the invention, the term "oxygen compound" is to be taken to mean the hydroxides and oxides of these elements.

The phosphor coating optionally further includes silicon dioxide, which may be in ionic form, for example potassium or sodium water glass, or in the form of colloidal $SiO_2$ particles.

The weight ratio between the totality of the coating material and the phosphor in the phosphor composition may range from 0.10% by weight to 2.0% by weight.

To prepare the phosphor composition in accordance with the invention, the pH-value of a phosphor slurry is set to 9 by means of diluted ammonia, and the slurry is ground with a silicate, for example potassium-water glass or colloidal $SiO_2$ particles having a particle size of 4 nm<d<30 nm, in which process use may alternatively be made of a different dispersing agent, for example a polycarboxylate, or optionally for example a polyacrylate-dispersed pigment suspension is ground together with the aqueous phosphor slurry, whereafter one or more aqueous solutions of the organic binders including amide or urethane groups selected from the group formed by the polyurethanes, polyacrylamides, polyamide resins, etherified melamine and melamine-formaldehyde compounds, etherified urea formaldehyde resins and, optionally, gelatins are added to the phosphor slurry, and, in addition, a stabilized pigment suspension and a solution of colloidal $SiO_2$ particles having an average grain size of 50 nm<d<150 nm may optionally be added to the phosphor slurry, the order in which the organic binder, colloidal $SiO_2$ particles and pigment are added may be changed if necessary, whereafter one or more salt solutions of one or more elements selected from the group formed by the alkaline earth elements and zinc are added to the phosphor slurry, and the pH-value of the phosphor slurry is raised to at least pH 7.0, and after filtering, the phosphor is dried at a temperature in the range from 110° C. to 200° C. This coating method enables phosphor powders to be coated, with sufficient adhesive strength, with silicon dioxide, pigments, organic binders with amide or urethane groups selected from the group formed by the polyurethanes, polyacrylamides, polyamide resins, etherified melamine and melamine-formaldehyde compounds, etherified urea-formaldehyde resins as well as with the oxygen compounds of the elements of the group formed by the alkaline earth elements and zinc.

Said coating method includes the following, successive process steps:

a) First, the pH-value of the phosphor slurry is set to at least 9 by means of diluted ammonia. In the subsequent grinding process, the untreated phosphor is dispersed by means of a silicate, for example potassium-water glass, or by means of a fine-grain $SiO_2$ colloid having a particle size of 4 nm<d<30 nm, which corresponds to a specific surface area of 100 $m^2$/g<$A_s$<550 $m^2$/g. The quantity of the ionic or fine-grain silicon dioxide (calculated as $SiO_2$) customarily lies in the range from 0.01% by weight to 0.15% by weight with respect to the untreated phosphor. It is alternatively possible to use a different dispersing agent, for example a polycarboxylate, in process step a). In process step a), grinding of the phosphor and wet-chemical pigmentation of the phosphor may optionally be carried out simultaneously, in that, for example, a polyacrylate-stabilized pigment suspension is added to the aqueous phosphor slurry, and the phosphor and the pigment suspension are jointly ground.

b) To this phosphor slurry are added the aqueous solutions of one or more water-soluble organic binders with amide or urethane groups selected from the group formed by the polyurethanes, polyacrylamides, polyamide resins, etherified melamine and melamine-formaldehyde compounds, etherified urea-formaldehyde resins as well as, optionally, gelatins. The overall quantity of the organic binder generally lies in the range from 0.01% by weight to 1.0% by weight with respect to the untreated phosphor. If necessary, the solution of a coarse-grain $SiO_2$ colloid having an average particle size of 50 nm<d<150 nm, corresponding to a specific surface area of 25 $m^2$/g<$A_s$<70 $m^2$/g, is added to the phosphor slurry. The quantity of the coarse-grain $SiO_2$ colloid (calculated as $SiO_2$) customarily ranges from 0.01% by weight to 1.0% by weight with respect to the untreated phosphor; the weight ratio of the $SiO_2$ to the overall quantity of the metal-oxygen compounds should not be less than 1:2, and the weight ratio of the $SiO_2$ to the overall quantity of the organic binder should not be less than 5:1. If necessary, also the wet-chemical pigmentation of the phosphor by adding, for example, a pigment suspension dispersed with polyacrylate may be carried out in the process step b). Organic binders, colloidal $SiO_2$ and the pigment may be added in random order.

c) One or more aqueous salt solutions of one or more elements selected from the group formed by the alkaline earth elements and zinc, for example their nitrates, sulphates, chlorides and acetates, are added to the phosphor slurry, the proportion of the oxygen compounds of the alkaline earth elements and of zinc ranging from 0.01% by weight to 1.0% by weight with respect to the untreated phosphor. In addition, the weight ratio of the silicon dioxide to the overall quantity of the metal oxides customarily ranges from 1:2 to 10:1.

d) By means of an ammoniacal solution, diluted potassium hydroxide solution or sodium hydroxide solution, the pH-value of the phosphor slurry is raised to at least pH 7.

e) The phosphor thus coated is allowed to sediment. Subsequently, decanting and, if necessary, washing and filtering take place.

f) At a temperature ranging from 110 to 200° C., the phosphor composition is dried in air for several hours.

The phosphor composition in accordance with the invention may be applied to the display screen, for example by means of the "flow coating" process, in the following manner. The coated phosphor powder having an emission color is dispersed in a binder solution, for example, on the basis of polyvinyl alcohol (PVA), which is photoactivated by means of, for example, ammonium dichromate (ADC). Dependent upon the phosphor used and the processing conditions of the suspension in the display screen process, the individual components of the phosphor suspension, that is phosphor powder, water, binder(s), dispersing agent(s), stabilizers and light-sensitive components are mixed in a predetermined order and concentration according to a defined formulation. The suspension of the phosphor composition is applied to the inner surface of the glass plate of the display screen prepared in the "flow coat" machine. Rotation of the display screen causes the phosphor suspension to be uniformly distributed over the display screen. Any excess suspension is centrifuged off. The moist phosphor layer thus formed is dried. On the inner side of the glass plate of the display screen, a shadow mask is arranged at some distance from the phosphor layer. Through this shadow mask, the phosphor layer is irradiated with ultraviolet light, causing the radiation-exposed regions of the phosphor layer to cure. The phosphor layer is developed by means of hot water, that is, the non-cured parts of the phosphor layer are removed. The structured phosphor layer is dried. These process steps are successively carried out for all three phosphor types emitting in green, blue and red. Subsequently, the display screen is heated to approximately 440° C. to remove any remaining binder from the phosphor layer.

EXAMPLE 1

A quantity of 650 g of a red-luminescent $Y_2O_2S$:Eu phosphor powder is washed with 0.1 N HCl solution at a pH-value ranging from 2 to 3 and subsequently decanted. Subsequently, the powder is washed a number of times with water and decanted until the phosphor suspension is acid-free. A quantity of 10.83 g $K_2SiO_3$ solution with 3.0% by weight $SiO_2$ solution are added as a dispersing agent. The pH-value is set to 8.8 by means of 1.0% by weight of KOH solution. After the addition of grinding bodies, this phosphor suspension is subjected to a wet-grinding process for 80 minutes. After separating the grinding bodies, diluting to a suspension volume of 2.0l by adding water, and wet-sieving, the stabilized phosphor suspension is obtained. To the properly dispersed suspension of the $Y_2O_2S$:Eu phosphor having a pH-value of 7.50 there is added 32.5 g of a 1.0% solution of polyacrylic acid having a molecular weight of 75,000. The phosphor suspension is stirred for 5 minutes. Next, 19.2 g of a 1.0% polyacrylamide solution having a molecular weight of 100,000 is added to the phosphor suspension, which is subsequently stirred for another 5 minutes. Subsequently, 13.0 g of a solution containing 1.0% by weight of a polyurethane with a molecular weight<6,000 is added and stirred for 5 minutes. Finally, 18.7 g of a 1.0% solution of a methoxy-methylated melamine is added to the phosphor suspension and stirred for 5 minutes. Next, 9.75 g $ZnSO_4$ solution with 4.0% by weight ZnO is added and also stirred for 5 minutes. As a result, the pH-value decreases to approximately 5.0. By adding 1.0% by weight of a KOH solution, the pH-value is raised to 8.3. After the phosphor suspension has been stirred for another 15 minutes, the suspension of the coated $Y_2O_2S$:Eu phosphor is allowed to sediment, whereafter it is decanted and washed once with 1.31 water. Finally, the coated phosphor is filtered-off and dried in air at 120° C. for approximately 16 hours.

EXAMPLE 2

A quantity of 800 g of a blue-luminescent phosphor powder is washed and dispersed with 0.5% by weight of a $SiO_2$ colloid having a particle size of 22 nm. A quantity of 12.8 g of a solution of a 1.0% polyacrylic acid having a molecular weight of 75,000 is added to the properly dispersed suspension of the ZnS:Ag phosphor having a pH-value of 8.9, and stirred for 5 minutes. Next, 14.2 g of a solution containing 1.0% by weight polyacrylamide having a molecular weight of 100,000 is added and also stirred for 5 minutes. Subsequently, a quantity of 6.9 g of a 1.0% solution of a methoxy-methylated melamine is added to the phosphor slurry and stirred for 5 minutes. Next, 66.7 g of a 3% solution of a $SiO_2$ colloid having an average particle size of 40 nm is added to the phosphor slurry and stirred for 5 minutes. Finally, 25.0 g of a $ZnSO_4$ solution containing 4.0% by weight ZnO is added to the phosphor slurry and stirred for 15 minutes. By adding 1-molar ammonia solution, the pH-value of the phosphor slurry is increased to a value of 8.4. After the suspension has been stirred for another 30 minutes, the suspension of the coated ZnS:Ag phosphor is allowed to set to, whereafter it is decanted and washed twice with approximately 1.7 l water. Finally, the coated phosphor is filtered-off and dried in air at 120° C. for approximately 16 hours.

EXAMPLE 3

A quantity of 700 g of a blue-luminescent ZnS:Ag phosphor powder is washed and dispersed in an aqueous phosphor slurry after adding 3% by weight of a fine-grain $CoAl_2O_4$ pigment in a polyacrylate-stabilized suspension. By means of diluted ammonia, the pH-value is set to 10.0. After 2 hours, the stabilized phosphor suspension is obtained, which is subsequently subjected to a wet-sieving process. The pH-value of the phosphor suspension is set to 5. A quantity of 1.1 g gelatin is stirred for 15 minutes in 110 ml water, which is previously heated to 60° C., so that the gelatin is dissolved. A quantity of 8 ml of a 1:10 diluted solution of methoxy-methylated melamine is added to the gelatin solution. This binder solution is slowly added to the phosphor suspension. The pH-value is set to 8 by adding 1 M ammonia solution, whereafter the phosphor suspension is stirred for 10 minutes. Next, 9.0 g of a 4.0% by weight ZnO in a $Zn(NO_3)_2$ solution is added to the phosphor suspension. The pH-value is set to 7. Subsequently, the phosphor suspension is stirred for at least 30 minutes. The hot solution is filtered off. The phosphor powder thus coated is dried in air at 125° C.

Measuring Results

Table 1 shows the positive influence of the inventive coating compositions on the processability of the phosphor powder, i.e., the sieving time of the coated red phosphor powder is substantially reduced by the presence of polyurethane as an organic binder. The inventive coatings C and D show that also in the presence of further organic binders, such as polyacrylate acid (coating D) or sodium alginate (coatings C to E) the very good sieving behavior (sieving times ranging from 15 to 26 minutes) caused by the addition of urethane group-containing binders are maintained. Without the addition of polyurethane as an organic binder, however, the sieving times range from 60 to 70 minutes (reference coatings A and B), which is relatively long.

TABLE 1

Influence of the polyurethane binder on the sieving time of 570 g coated $Y_2O_2S$:Eu phosphor powders.

| Sample | Coating composition | Sieving time |
|---|---|---|
| Phosphor compositions without polyurethane | | |
| A | 0.050% by weight $SiO_2$<br>0.11% by weight gelatin<br>0.0495% by weight Na-alginate<br>0.060% by weight ZnO from $ZnSO_4$ | 70 |
| B | 0.050% by weight $SiO_2$<br>0.12% by weight methoxymeth. melamine<br>0.0495% by weight Na-alginate<br>0.060% by weight ZnO from $ZnSO_4$ | 60 |
| Phosphor compositions with polyurethane | | |
| C | 0.050% by weight $SiO_2$<br>0.084% by weight polyurethane<br>0.0436% by weight Na-alginate<br>0.060% by weight ZnO from $ZnSO_4$ | 26 |
| D | 0.050% by weight $SiO_2$ from $K_2SiO_3$<br>0.050% by weight polyacrylic acid<br>0.050% by weight polyurethane<br>0.0275% by weight Na-alginate<br>0.060% by weight ZnO from $ZnSO_4$ | 15–20 |

FIG. 1 shows the positive effect of the inventive coating compositions on the stability of ZnS-phosphor suspensions, i.e., in comparison with completely inorganic coating compositions of particle-shaped silicon dioxide and ZnO (coatings x), the presence of polyurethane as an organic binder (coatings●) causes the stability of the particle size distribution of the phosphor suspension ("dimensional stability") to be improved after a one-minute ultrasound treatment under the action of electrolyte solution. The average particle size $d_{50}$ of the phosphor suspension before (−U.S.) and after (+U.S.) the ultrasound treatment was measured using the Coulter method, according to which the "dimensional stability" of the suspension is higher as the difference between the measured values is smaller. Particularly in the case of a higher proportion of metal oxide (small $SiO_2$/ZnO-ratio) in the coating, the stabilizing effect caused by the addition of the organic binder becomes manifest.

Figure 2:
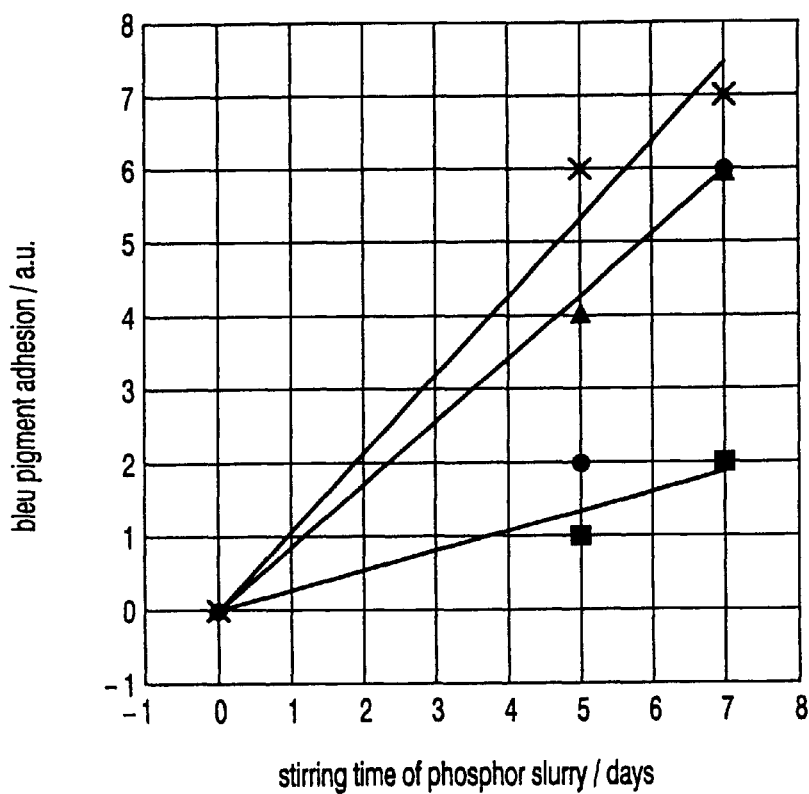
FIG. 2 shows the adhesion of the pigment in phosphor compositions in accordance with the invention and in a reference phosphor composition.

FIG. 2 shows the positive influence of the inventive coating compositions on the adhesion of the pigment. If a suspension of pigmented ZnS:Ag,Al phosphor, which is pigmented with $CoAl_2O_4$, is added to a PVA/ADC suspension and stirred for a number of days, then a substantial reduction of the loose pigment content is observed, which is measured as bluing of the supernatant part of the suspension after 24 hours of sedimentation, when the organic binder includes, apart from gelatin (coating x), etherified melamine compounds, in this case two different methoxy-methylated melamine compounds (coatings ▲●■). Finally, the combination of the two above-mentioned organic binders with gelatin (coating ■) exhibits the best pigment adhesion.

What is claimed is:

1. A display screen comprising a phosphor layer which includes a phosphor with a coating comprising a water-soluble organic binder selected from the group consisting of polyurethanes, polyacrylamides, polyamide resins, etherified melamine compounds, melamine-formaldehyde compounds and etherified urea-formaldehyde resins, and oxygen compounds of one or more elements selected from the group consisting of alkaline earth elements and zinc.

2. A display screen comprising a phosphor layer as claimed in claim 1, wherein the water-soluble organic binder has a molecular mass below 300,000.

3. A display screen comprising a phosphor layer as claimed in claim 2 wherein the water-soluble organic binder has a molecular mass below 100,000.

4. A display screen comprising a phosphor layer as claimed in claim 1, wherein the water-soluble organic binder is a polyurethane compound having a molecular mass below 20,000.

5. A display screen comprising a phosphor layer as claimed in claim 1, wherein the oxygen compound is a zinc-oxygen compound.

6. A display screen comprising a phosphor layer as claimed in claim 1, wherein the coating includes 0.01% by weight to 15% by weight of a color filter pigment.

7. A display screen comprising a phosphor layer as claimed in claim 1, wherein the water-soluble organic binder comprises a compound selected from the group consisting of polyacrylamides and gelatin, and at least a compound selected from the group consisting of etherified melamine compounds and melamine-formaldehyde compounds and etherified urea-formaldehyde resins, the weight ratio of the compounds selected from the group consisting of polyacrylamides and gelatin relative to the overall quantity of the compounds selected from the group consisting of etherified melamine compounds, melamine-formaldehyde compounds and etherified urea-formaldehyde resins ranging from 1:5 to 20:1.

8. A display screen comprising a phosphor layer as claimed in claim 1, wherein the phosphor composition comprises polycarboxylates, gelatin or silicon dioxide.

9. A display screen comprising a phosphor layer as claimed in claim 8, wherein the solids content of the water-soluble organic binder in the coating ranges from 0.01% by weight to 1.0% by weight relative to the phosphor, that the content of the oxygen compounds of the alkaline earth elements and zinc in the coating ranges from 0.01% by weight to 0.80% by weight relative to the phosphor, and that the silicon dioxide content, calculated as $SiO_2$, in the coating ranges from 0.01% by weight to 1.0% by weight relative to the phosphor.

10. A display screen comprising a phosphor layer as claimed in claim 8, wherein the silicon dioxide is composed of silicate particles or of colloidal $SiO_2$ particles having an average particle size of 4 nm<d<150 nm in accordance with a specific surface area of 25 $m^2/g$<$A_s$<550 $m^2/g$.

11. A display screen comprising a phosphor layer as claimed in claim 10, wherein the weight ratio of the $SiO_2$ particles (calculated as $SiO_2$) relative to the overall quantity of the oxygen compounds of the alkaline earth elements and zinc lies in the range from 1:10 to 30:1, and the weight ratio of the $SiO_2$ particles relative to the overall quantity of the organic binder lies in the range from 1:30 to 30:1.

12. A phosphor composition of a phosphor with a coating comprising a water-soluble organic binder, which is selected from the group consisting of polyurethanes, polyacrylamides, polyamide resins, etherified melamine compounds and melamine-formaldehyde compounds and etherified urea-formaldehyde resins, and comprising oxygen compounds of one or more elements selected from the group formed by the alkaline earth elements and zinc.

* * * * *